Nov. 19, 1940. L. W. POLIT 2,222,466
FAUCET
Filed Aug. 30, 1938

Inventor,
Louis W. Polit,
by Robert, Cushman & Woodbury
Attys.

Patented Nov. 19, 1940

2,222,466

UNITED STATES PATENT OFFICE 2,222,466

FAUCET

Louis W. Polit, Boston, Mass.

Application August 30, 1938, Serial No. 227,500

1 Claim. (Cl. 251—27)

This invention relates to an improvement in faucets or the like and more particularly in the control valve units therefor.

The primary object of this invention is to provide a faucet the control valve unit of which comprises a conically tapered valve preferably of yieldable composition and a conically tapered valve seat, the valve being independent of the stem of the faucet and forced into the seat by that stem and lifted and shifted laterally of the stem by the head of water.

Other objects of the invention reside in provision in the casing of such a faucet of a continuation of the valve seat on which the valve may rest when lifted; and in making the valve and valve seat of such depth that when the stem is raised to the highest point and the valve lifted accordingly a portion of the valve remains in the seat.

These and other objects will appear from a consideration of the following description of one embodiment of the invention and of the drawing which forms a part thereof and in which Fig. 1 is a side elevation, parts being broken away of a faucet embodying this invention, the valve being shown closed;

Figure 1:
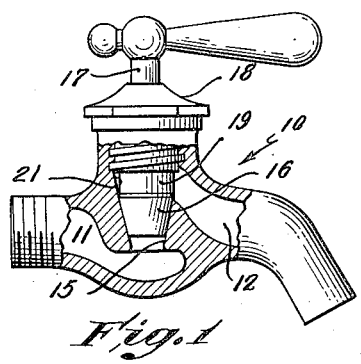

Heretofore it has been the general practice in faucets or the like to employ a valve in the form of a washer which when closed engages a planar valve seat so that the sealing is due to the engagement of the flat surface of the washer with the valve seat. Such washer moreover is secured to the stem so that it is positively raised and lowered thereby. Obviously the frictional movement of the washer upon its seat resulting from tightening or loosening the valve results in eroding the washer so that the faucet leaks and the washer must be replaced. For that reason it is the usual practice to attach the washer to the stem by a set screw or similar removable means.

The objectionable condition resulting from securing the valve to the stem has been recognized and attempts have been made to overcome it. One such attempt consists in employing in place of the washer a disk or block having an upwardly extending post which enters a centrally arranged pocket or recess in the stem to prevent the valve from being carried by the flow of water laterally out of register with the seat so that when the stem is turned down the valve will not seat properly and leakage of water will occur. Another attempt consists in providing a recess in the top surface of the disk or block which receives the end of the stem, such end being preferably tapered.

A faucet embodying the present invention is similar to those above mentioned in that functional erosion of the valve is avoided by making the valve separate from the stem so that it will be raised from its seat by the flow of water and returned directly thereto by the pressure of the stem. It differs therefrom in that no interrelation between the valve and stem is provided to insure proper seating of the valve. This seating is insured by providing a conically tapered valve and a conically tapered seat therefor, so that when seated the conical surfaces of valve and seat are in contact.

The embodiment of the invention shown in the drawing consists of a faucet 10 of the usual type comprising a casing having an inlet chamber 11 and an outlet chamber 12, the chambers being connected by a port. The port is defined by a conically tapered valve seat 15 and is opened or closed by a conically tapered valve 16. Threadedly mounted in the casing is a stem 17 which extends through a cap 18. The end 19 of the stem is adapted to bear upon the head of the valve 16.

The valve 16 may be composed of rubber or similar yieldable material having a disk 20 of metal or suitable wear-resisting material embedded in or secured to the head. When the stem 17 is turned down the valve is forced thereby into the seat and due to its yieldable composition any leaking is prevented. When the stem 17 is raised the valve is lifted from its seat by the head of the water in the inlet chamber 11, the amount of lifting and consequently the amount of water allowed to flow is of course regulated by the distance the stem is raised, the lifted valve being held by the flow in contact with the end of the stem.

Figure 2:
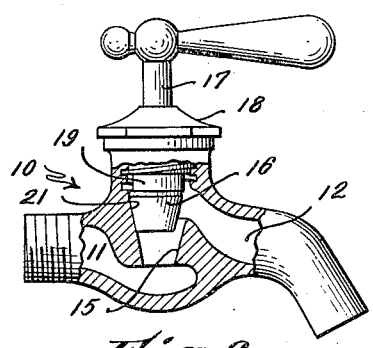
Fig. 2 is a view similar to Fig. 1, the valve however being shown open.
Figure 3:
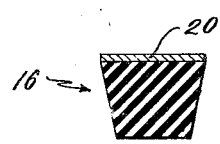
Fig. 3 is a perspective view of the valve.

The water allowed to flow will naturally take the shortest path through the port to the outlet chamber so that the valve, as it is lifted, will be shifted laterally (see Fig. 2) and the greater part of the water will flow past the valve at the side nearest the outlet chamber 12. In order to facilitate this movement of the valve and to avoid any undue cocking of the valve the taper of the valve seat is continued in the casing, as indicated by the numeral 21. A further advantage of continuing the valve seat is that it eliminates the pocket usually formed in the casing and in which chips and other debris may collect.

Heretofore the valve member of a faucet has usually been made of leather or other wear-resisting material due to the frictional erosion set up. The valve 16, however, may be and preferably is made of a yieldable composition so that it will effectively seal the faucet by reason of its yieldable engagement with the seat 15. This seal is also effective by reason of the large area over which the valve and seat are in contact as shown in Fig. 1.

The depth of the valve and seat is preferably such that even when the stem is raised to the highest point permitted by the casing, a portion of the valve remains within the seat. The disk 20, when employed, is in contact with the end 19 of the stem so that any frictional wear resulting from the rotation of the stem will be taken by the disk and not by the yieldable composition of the valve.

It will be noted that should the necessity arise the valve 16 may be replaced by removing the stem 17 and cap 18 from the casing, The term "faucet" as used herein and in the claim is of sufficient scope to include similar articles such as, for example, bibs, taps, cocks and the like through which water or other liquids may flow.

The essence of the invention resides in the conically tapered valve and valve seat and parts associated therewith, and hence although only one embodiment of the invention is herein shown and described it will be understood that it is not limited thereto and that other embodiments may be made without departing from the spirit and scope of the invention as set forth in the following claim.

I claim:

In a faucet comprising a casing having an inlet chamber and an outlet chamber connected by a port, a conical valve seat defining said port, a conical valve of yieldable material in said port, the taper of the valve and of the seat being approximately the same so that when the valve is seated in the port the walls of the valve and seat are firmly in contact over a substantial area thereby closing the port against the passage of water between the chambers and a stem mounted in the faucet with its lower end in contact with the head of the valve, the taper of the valve seat being such that the enlarged end is toward the stem and the larger end of the valve and the lower end of the stem being of substantially the same diameter, said valve being movable both axially and radially in the port independent of the stem, whereby when the stem is lowered the valve is advanced thereby into the port and seated therein with its wall in yieldable engagement with the wall of the conical valve seat over a considerable area and when the stem is raised the pressure of the water against the valve raises the valve from the seat against the end of the stem and shifts the valve radially into contact with the wall of the valve seat at one side of the port thereby providing a continuous passage for the water from the inlet chamber to the outlet chamber through the port.

LOUIS W. POLIT.